United States Patent
Kemertas

(10) Patent No.: US 11,645,323 B2
(45) Date of Patent: May 9, 2023

(54) COARSE-TO-FINE MULTIMODAL GALLERY SEARCH SYSTEM WITH ATTENTION-BASED NEURAL NETWORK MODELS

(71) Applicant: SAMSUNG ELECTRONICS CO., LTD., Suwon-si (KR)

(72) Inventor: Mete Kemertas, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 273 days.

(21) Appl. No.: 17/072,905

(22) Filed: Oct. 16, 2020

(65) Prior Publication Data

US 2021/0263961 A1  Aug. 26, 2021

Related U.S. Application Data

(60) Provisional application No. 62/981,654, filed on Feb. 26, 2020.

(51) Int. Cl.
    *G06F 16/903* (2019.01)
    *G06F 16/435* (2019.01)
    *G06F 17/18* (2006.01)
    *G06F 17/16* (2006.01)

(52) U.S. Cl.
    CPC ......... *G06F 16/435* (2019.01); *G06F 16/903* (2019.01); *G06F 17/16* (2013.01); *G06F 17/18* (2013.01)

(58) Field of Classification Search
    CPC .................................................. G06F 16/903
    USPC ......................................................... 707/748
    See application file for complete search history.

(56) References Cited

U.S. PATENT DOCUMENTS

| | | | |
|---|---|---|---|
| 7,739,276 B2 | 6/2010 | Lee et al. | |
| 8,935,246 B2 | 1/2015 | Bengio et al. | |
| 9,053,386 B2 | 6/2015 | Xue | |
| 9,280,206 B2 | 3/2016 | Nagar et al. | |
| 9,411,830 B2 | 8/2016 | Mei et al. | |
| 10,140,315 B1 * | 11/2018 | Hohwald | G06F 16/24578 |
| 10,459,995 B2 | 10/2019 | Lev-Tov et al. | |
| 11,048,744 B1 * | 6/2021 | Hohwald | G06F 16/51 |
| 11,409,791 B2 * | 8/2022 | Torabi | G06F 16/638 |
| 2012/0093371 A1 | 4/2012 | Li et al. | |
| 2017/0270222 A1 | 9/2017 | Wang et al. | |
| 2018/0336241 A1 * | 11/2018 | Noh | G06F 16/242 |
| 2021/0303614 A1 * | 9/2021 | Yim | G06F 16/535 |

* cited by examiner

*Primary Examiner* — Kimberly L Wilson
(74) *Attorney, Agent, or Firm* — Sughrue Mion, PLLC

(57) ABSTRACT

A method, computer program, and computer system is provided for multimodal content retrieval. A search query corresponding to a request for content is received. Content features corresponding to a subset of content items from among a plurality of content items are retrieved based on receiving the search query. Similarity values are calculated between the search query and the retrieved content features. Attention scores are determined for the calculated similarity values. A content item is selected from among the subset of content items of the plurality of content items. The selected content item contains a content feature corresponding to a highest attention score of the attention scores.

15 Claims, 8 Drawing Sheets

COARSE-TO-FINE MULTIMODAL GALLERY SEARCH SYSTEM WITH ATTENTION-BASED NEURAL NETWORK MODELS

CROSS-REFERENCE TO RELATED APPLICATION(S)

This application is based on and claims benefit under 35 U.S.C. § 119 to U.S. Provisional Patent Application No. 62/981,654, filed on Feb. 26, 2020, in the U.S. Patent and Trademark Office, the disclosure of which is incorporated by reference.

BACKGROUND

This disclosure relates generally to field of data processing, and more particularly to content retrieval.

Attention-based multimodal content retrieval systems use the computation of pairwise similarity scores between sub-content in different modality to determine the content to be retrieved. These pairwise scores are aggregated into a single matching score with weighted averaging based on attention weights.

SUMMARY

Embodiments relate to a method, system, and computer readable medium for multimodal content retrieval. According to one aspect, a method for multimodal content retrieval is provided. The method may include receiving a search query corresponding to a request for content. Content features corresponding to a subset of content items from among a plurality of content items are retrieved based on receiving the search query. Similarity values are calculated between the search query and the retrieved content features. Attention scores are determined for the calculated similarity values. A content item is selected from among the subset of content items of the plurality of content items. The selected content item contains a content feature corresponding to a highest attention score of the attention scores.

According to another aspect, a computer system for multimodal content retrieval is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a search query corresponding to a request for content. Content features corresponding to a subset of content items from among a plurality of content items are retrieved based on receiving the search query. Similarity values are calculated between the search query and the retrieved content features. Attention scores are determined for the calculated similarity values. A content item is selected from among the subset of content items of the plurality of content items. The selected content item contains a content feature corresponding to a highest attention score of the attention scores.

According to yet another aspect, a computer readable medium for multimodal content retrieval is provided. The computer readable medium may include one or more computer-readable storage devices and program instructions stored on at least one of the one or more tangible storage devices, the program instructions executable by a processor. The program instructions are executable by a processor for performing a method that may accordingly include receiving a search query corresponding to a request for content. Content features corresponding to a subset of content items from among a plurality of content items are retrieved based on receiving the search query. Similarity values are calculated between the search query and the retrieved content features. Attention scores are determined for the calculated similarity values. A content item is selected from among the subset of content items of the plurality of content items. The selected content item contains a content feature corresponding to a highest attention score of the attention scores.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
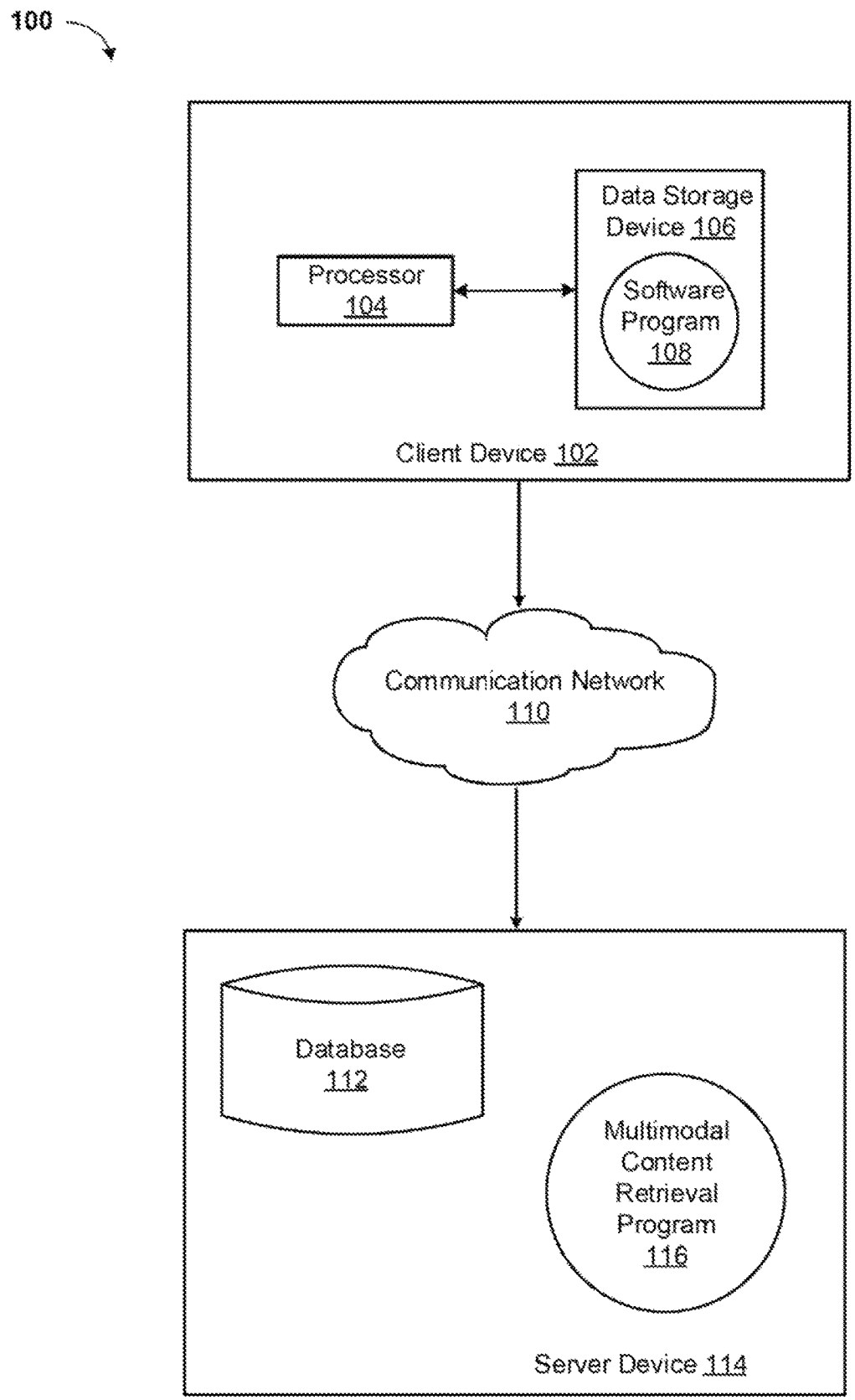
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to content retrieval. The following described exemplary embodiments provide a system, method and computer program to, among other things, retrieve content based on calculating an average value associated with one or more content features. Therefore, some embodiments have the capacity to improve the field of computing by allowing for overcome the real-time performance challenge that comes with the conventional multimodal context retrieval systems.

As previously described, attention-based multimodal content retrieval systems use the computation of pairwise similarity scores between sub-content in different modality to determine the content to be retrieved. These pairwise scores are aggregated into a single matching score with weighted averaging based on attention weights. However, computing attention can be computationally expensive and render real-time retrieval infeasible for large galleries. An attention computation may be a bottleneck in scaling attention-based image and video search. If the number of images from which a selection may be made is large, scaling may be difficult. For example, given R detected regions per image, and L words per query in a text-to-image retrieval scenario, R×L vector similarities (e.g. cosine similarity) may need to be computed per image. Given K images from which an image may be selected, the total vector operations may scale as K×R×L, where R×L can be large (e.g. R=30, L=10). This does not scale well when K is large (e.g. a smartphone gallery with thousands of images/videos). It may be advantageous, therefore, to avoid the attention computations and running vector similarity/distance operations on simply averaged vectors can serve as a strong coarse filtering step (a single vector similarity operation per image instead of R×L), after which only a selected few images (T<<K) may be scored with the attention module. For example, the average retrieval runtime for coarse-to-fine filtering may be less than the runtime for conventional retrieval, and a percentage of times a correct content item being searched may be among the top M ranked candidates may be calculated. While leveraging the attention module may improve precision, skipping the attention step for most content items and using simply averaged feature vectors may be sufficient for coarsely filtering without a significant drop in performance.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and computer program that allows scaling attention-based content retrieval models to search large galleries in real-time without sacrificing retrieval accuracy. This content retrieval may not require learning additional parameters, but may leverage the same model for faster retrieval by simply averaging vectors. While leveraging the attention module may improve precision, skipping the attention step and using simply averaged feature vectors may be sufficient for coarsely filtering without a significant drop in performance.

Referring now to FIG. 1, a functional block diagram of a networked computer environment illustrating a system 100 (hereinafter "system") for multimodal content retrieval. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a client device 102 and a server device 114. The client device 102 may communicate with the server device 114 via a communication network 110 (hereinafter "network"). The client device 102 may include a processor 104 and a software program 108 that is stored on a data storage device 106 and is enabled to interface with a user and communicate with the server device 114. As will be discussed below with reference to FIG. 5, the client device 102 may include internal components 800A and external components 900A, respectively, and the server device 114 may include internal components 800B and external components 900B, respectively. The client device 102 may be, for example, a mobile device, a telephone, a smartphone, a personal digital assistant, a netbook, a laptop computer, a tablet computer, a desktop computer, a television, a smart television, a set-top box, or any type of computing device capable of running a program, accessing a network, and accessing a database.

The server device 114 may also operate in a cloud computing service model, such as Software as a Service (SaaS), Platform as a Service (PaaS), or Infrastructure as a Service (IaaS), as discussed below with respect to FIGS. 6 and 7. The server device 114 may also be located in a cloud computing deployment model, such as a private cloud, community cloud, public cloud, or hybrid cloud.

The server device 114 is enabled to run a Multimodal Content Retrieval Program 116 (hereinafter "program") that may interact with a database 112. The Multimodal Content Retrieval Program method is explained in more detail below with respect to FIG. 3. In one embodiment, the client device 102 may operate as an input device including a user interface while the program 116 may run primarily on server device 114. In an alternative embodiment, the program 116 may run primarily on one or more devices 102 while the server device 114 may be used for processing and storage of data used by the program 116. It should be noted that the program 116 may be a standalone program or may be integrated into a larger multimodal content retrieval program. For example, the program 116 may be incorporated within the software program 108, such that the client device 102 may be a standalone device.

It should be noted, however, that processing for the program 116 may, in some instances be shared amongst the client devices 102 and the server devices 114 in any ratio. In another embodiment, the program 116 may operate on more than one computer, server device, or some combination of client devices and server devices, for example, a plurality of client devices 102 communicating across the network 110 with a single server device 114. In another embodiment, for example, the program 116 may operate on a plurality of server devices 114 communicating across the network 110 with a plurality of client devices. Alternatively, the program may operate on a network server communicating across the network with a server and a plurality of client devices. In another embodiment, the program 116 may be contained entirely within the software program 108 and may run entirely on the client device 102.

The network 110 may include wired connections, wireless connections, fiber optic connections, or some combination thereof. In general, the network 110 can be any combination of connections and protocols that will support communications between the client device 102 and the server device 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2A:
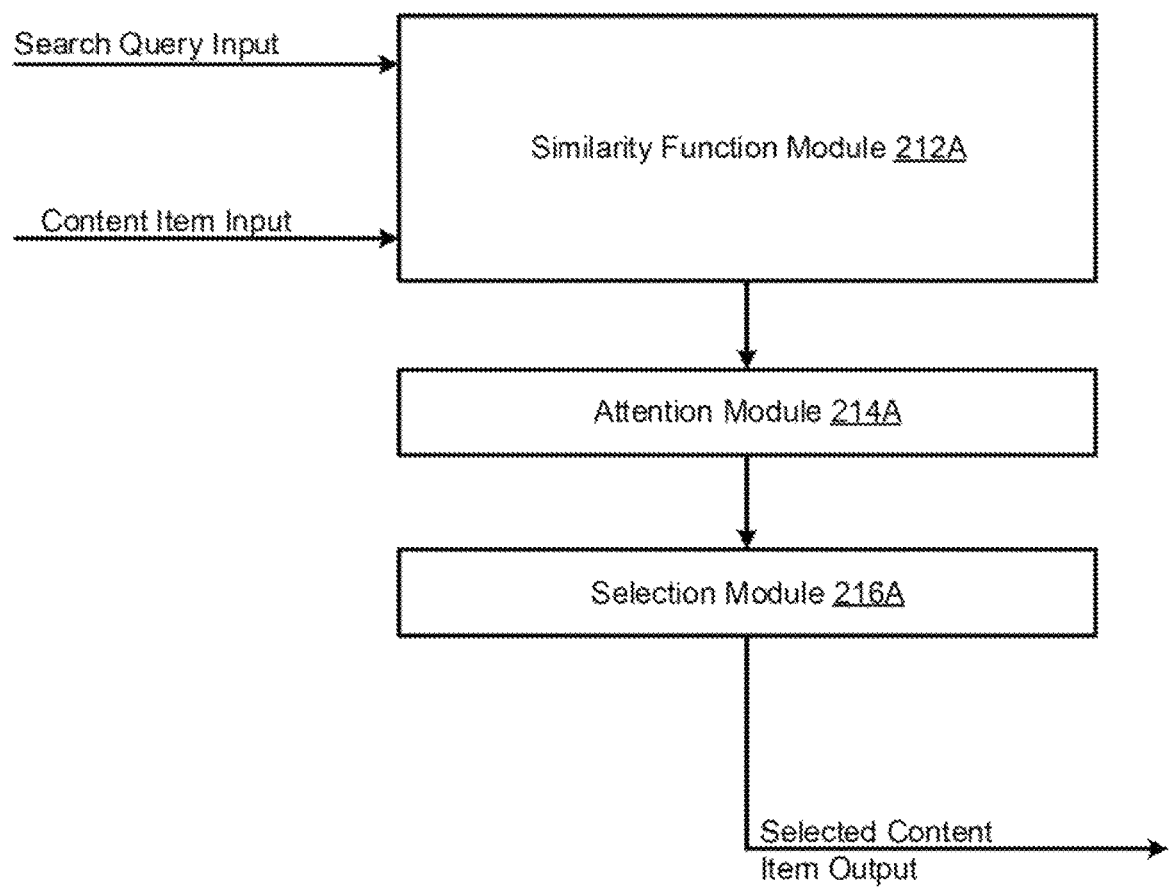
FIGS. 2A and 2B are block diagrams of a system for multimodal content retrieval, according to at least one embodiment.

Referring now to FIG. 2A, a block diagram of a multimodal content retrieval system 200A is depicted. The multimodal content retrieval system 200A may include a similarity function module 212A, an attention module 214A, and a selection module 216A. The similarity function module 212A may receive a search query and content items as inputs. The similarity function module 212A may output similarity values between the search query and the content items to the attention module 214A. The attention module 214A may calculate attention scores for the content items based on the similarity values. The selection module 216A may select the content item having the highest attention score.

Figure 2B:
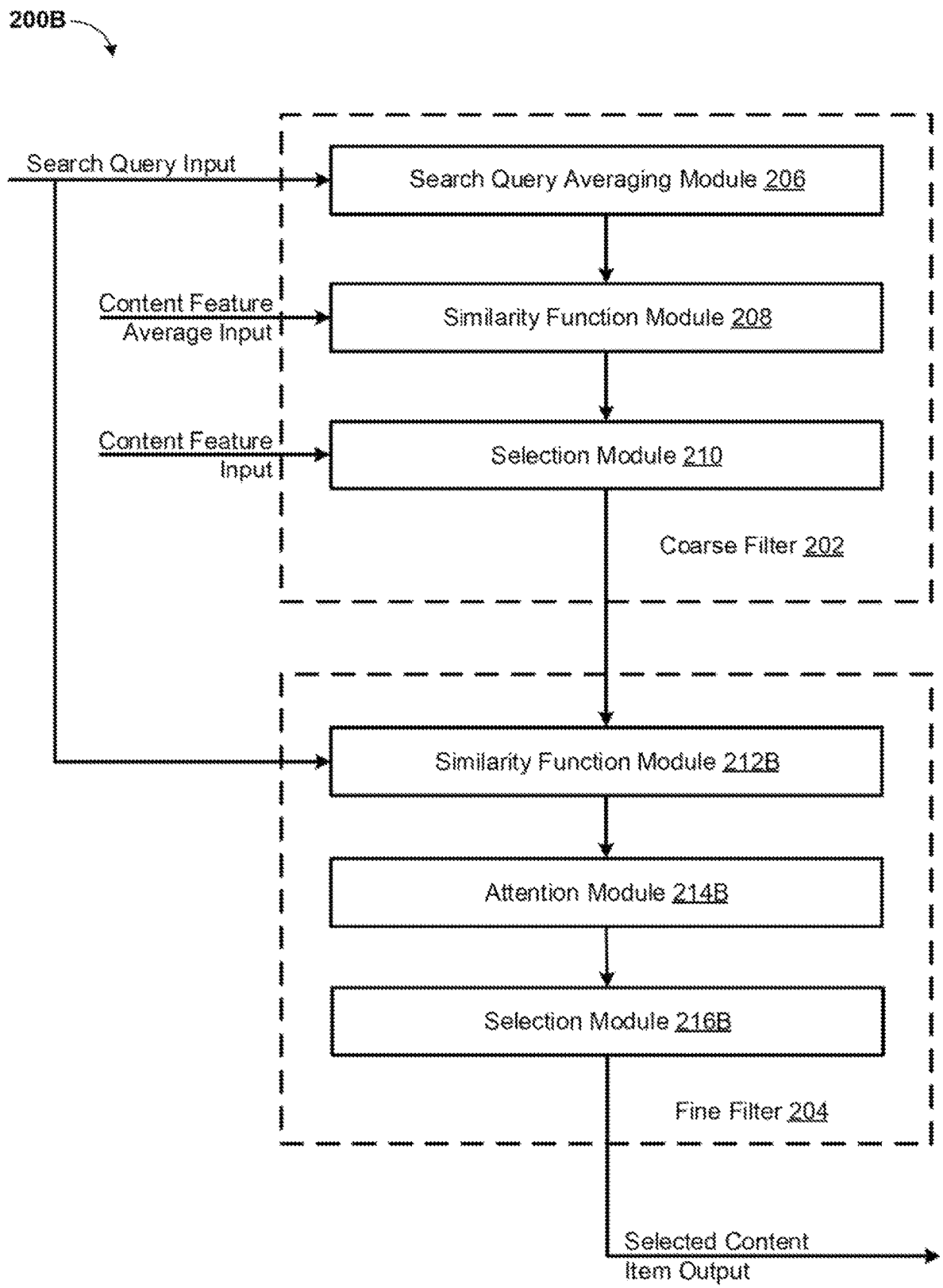

Referring now to FIG. 2B, a block diagram of a multimodal content retrieval system 200B, is depicted. The multimodal content retrieval system may include, among other things, a coarse filter 202 and a fine filter 204. The coarse filter 202 may include a search query average function module 206, a similarity function module 208, and a selection module 210. The fine filter 204 may include a similarity function module 212B, an attention module 214B, and a selection module 216B.

It may be appreciated that the method, computer system, and computer readable medium discussed herein may be applicable to a wide range of multimodal retrieval tasks. However, by way of example and not of limitation, application to a text-to-image retrieval scenario is discussed. The cross attention approach may be used to compute a similarity between a given query and a set of images. For example, a user may specify a textual query $q_0$ as an ordered sequence of n words. Given this query, a set G of K images, (i.e., a gallery of images) may be searched, such that $G=\{i_k | k \in 1 \ldots K\}$.

The search query average function module 206 may accept an input query or sequence of vectors corresponding to each subregion (i.e., word) of the query from a text encoder via the search query input. A query encoding, $q \in R^{n \times d}$, may be computed by from the input query as $q=f_1(q_0; \theta_r)$, where $f_1$ may denote a text encoder mapping a sequence of words to a sequence of vectors and $\theta_1$ may correspond to one or more parameters. The i-th row $q^{(i)} \in R^d$ of the matrix q may correspond to a contextualized vector representation for the i-th word. The contextualized vector representations may be averaged together into a query average value by the search query average function module 206. The text encoder may include transformer architectures, as well as word embedding layers that may be followed by a neural network, such as bidirectional recurrent neural networks. The query encoding may be computed in real-time after the user specifies a query.

A visual encoder may produce a set of region vectors for each image. The image encoder, for example, may process each image independently and may produce a set of vectors, $r_k=\{r_{k,j} \in R^d | j \in 1 \ldots m\}$. For each image $i_k$, $r_k=f_2(i_k; \theta_2)$, where $f_2$ may denote a function that may map images to a set of vectors. Visual encoders may include cases where individual vectors $r_{k,j}$ may correspond to vector representations for detected salient regions in an image or grid cells. $r_{k,j}$ may be referred to as a region vector. The computations for image encoding may be performed offline, and the resulting region vectors may be stored in a random-access memory.

The similarity function module may receive content items or content features (i.e., region vectors) or may retrieve the stored region vectors produced by a visual encoder. The similarity function module 208 may calculate or receive a simple mean of region embeddings:

$$\hat{r}_k^{(i)} = \frac{1}{m}\sum_{j=1}^{m} r_{k,j}, \forall i \in 1 \ldots n$$

that may be used as a content average value for content features associated with content items and which may be used as a noisy approximation to an attention score. Thus, when the mean operation of the similarity function module 208 may be combined with the similarity calculation of the search query average function module 206, an overall similarity value for the content feature may be derived as:

$$\hat{s}_k = h\left(\hat{r}_k, \frac{1}{n}\sum_{i=1}^{n} q^{(i)}\right).$$

The overall similarity value calculated by the similarity function module 208 may be a comparison between two average vectors over regions and words. For certain choices of similarity functions h (i.e., negative $L_1$ distance), the added noise may be zero.

As a coarse search capability, a filter size T<<K may be specified by the selection module 210, such that only the top T elements of the coarse search may be processed with the complete cross attention to find the top matching items.

For each word-region pair based on the subset of features identified by the selection module 210 of the coarse filter 202, a similarity score may be computed by the similarity function module 212B. Similar to the search query average function module 206, the similarity function module 212B may may accept an input query or sequence of vectors corresponding to each subregion (i.e., word) of the query from the text encoder via the search query input. The subset of features may include, among other things, features corresponding to a top T number of ranked images corresponding to the search query from among the gallery of images as determined by the coarse filter 202. The similarity function module 212B may use a similarity function g: $R^d \times R^d \rightarrow R$ (e.g., cosine similarity, negative $L_p$ distance), such that $s_{k,j}^{(i)}=g(r_{k,j}, q^{(i)})$ in order to calculate one or more similarity values between the search query and the image features.

Attention weights may be computed by the attention module 214B with the softmax function:

$$\alpha_{k,j}^{(i)} = \frac{\exp(s_{k,j}^{(i)})}{\sum_{j'} \exp(s_{k,j'}^{(i)})}.$$

Using these attention weights, a distinct weighted average of region vectors may be computed for each word:

$$\hat{r}_k^{(i)} = \sum_{j=1}^{m} \alpha_{k,j}^{(i)} r_{k,j}.$$

A similarity score between the query and the image may be computed via a similarity function, h: $R^d \times R^d \to R$:

$$s_k = \frac{1}{n}\sum_{i=1}^{n} h(\hat{r}_k^{(i)}, q^{(i)}).$$

The attention may also be computed in the opposite direction (i.e., for regions over words), such that:

$$\alpha_{k,j}^{(i)} = \frac{\exp(s_{k,j}^{(i)})}{\sum_{i'} \exp(s_{k,j}^{(i')})}.$$

Similarly, a query representation may be computed for each region:

$$\hat{q}_{k,j} = \sum_{i=1}^{n} \alpha_{k,j}^{(i)} q^{(i)}$$

before aggregating the scores into a scalar:

$$s_k = \frac{1}{m}\sum_{j=1}^{m} h(\hat{r}_{k,j}, \hat{q}_{k,j}).$$

The selection module 216B may select an image corresponding to the identified feature having the greatest attention score.

Figure 3:
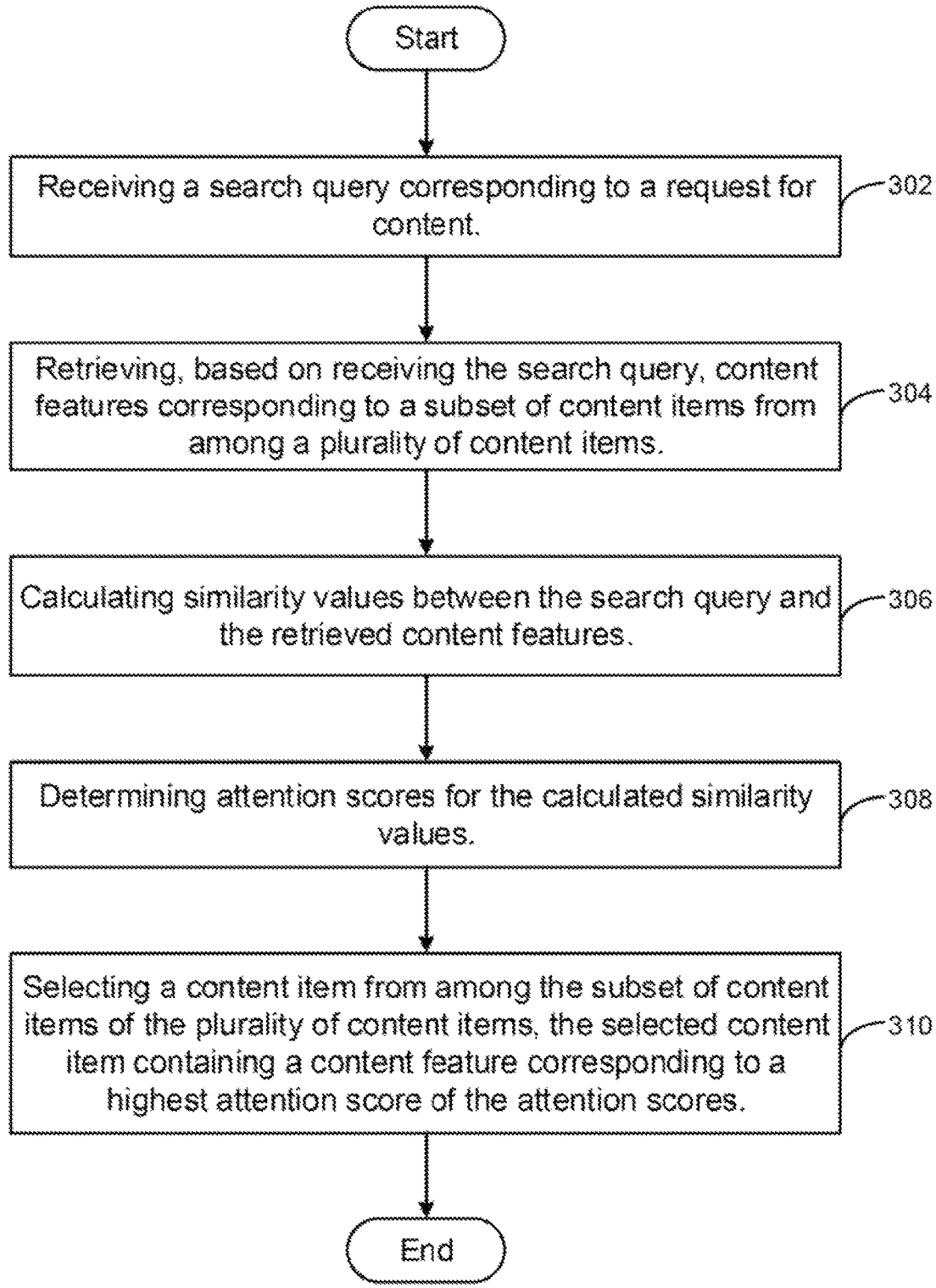
FIG. 3 is an operational flowchart illustrating the operations carried out by a program for multimodal content retrieval, according to at least one embodiment.

Referring now to FIG. 3, an operational flowchart 300 illustrating the operations carried out by a program for multimodal content retrieval is depicted. FIG. 3 may be described with the aid of FIGS. 1 and 2. As previously described, the Multimodal Content Retrieval Program 116 (FIG. 1) may quickly and effectively search large galleries in real-time without sacrificing retrieval accuracy.

At 302, a search query corresponding to a request for content is received. According to one or more embodiments, the device may be a smartphone, in which a user may input a query through a keyboard of the smartphone or by speech recognition. According to one or more embodiments, the device may be a laptop or desktop computer, in which a user may enter a query on a web browser or self-contained program. According to one or more embodiments, the device may be a smart television or a set-top box, in which a user may enter a query by typing with a remote or through speech recognition by a microphone inside the remote, smart television, or set-top box. In operation, the client device 102 (FIG. 1) may receive a user query through one or more input devices. The software program 108 (FIG. 1) may store the received query in the data storage device 106 (FIG. 1) or a RAM of the client device 102. Alternatively, the client device 102 may transmit the query to the server device 114 (FIG. 1) over the communication network 110. The received search query may be averaged by the search query average function module 206 (FIG. 2B).

At 304, content features corresponding to a subset of content items are retrieved from among a plurality of content items based on receiving the search query. According to one or more embodiments, the content features may correspond to features extracted from one or more images from among a gallery of images. According to one or more embodiments, the content features may correspond to features extracted from one or more videos from among a gallery of videos. In operation, the selection module 210 (FIG. 2B) may identify a subset of content items from among the content items based on the feature averages. The content feature averages may be computed ahead of time and, thus, may be retrieved from the database 112 (FIG. 1) on the server device 114 (FIG. 1) or the data storage device 106 (FIG. 1) of the client device 102 (FIG. 1).

At 306, similarity values between the search query and the retrieved content features are calculated. The similarity values may be calculated based on performing a vector distance operation or a vector similarity operation on averaged vectors associated with the retrieved content features. In operation, the similarity function module 212B (FIG. 2B) may compute similarity values using region vectors associated with the subset of content items identified by the selection module 210 (FIG. 2B).

At 308, attention scores are determined for the calculated similarity values. The attention scores may be computed pairwise between sub-content in a first modality (e.g., regions or objects detected in an image, frames sampled from a video, etc.) and a second modality (e.g., words of a sentence, segments of a spoken utterance, etc.). In operation, the attention module 214B (FIG. 2B) may compute one or more attention scores based on the similarity values calculated by the similarity function module 212B (FIG. 2B).

At 310, a content item is selected from among the subset of content items of the plurality of content items, the selected content item containing a content feature corresponding to a highest attention score of the attention scores. The cross attention similarity may be computed on a subset of strong candidates to arrive at the final matching values. In operation, the selection module 216B (FIG. 2B) may identify an image corresponding to the content feature having the greatest attention score. The software program 108 (FIG. 1) on the client device 102 (FIG. 1) may display the identified image to a user.

Figure 4:
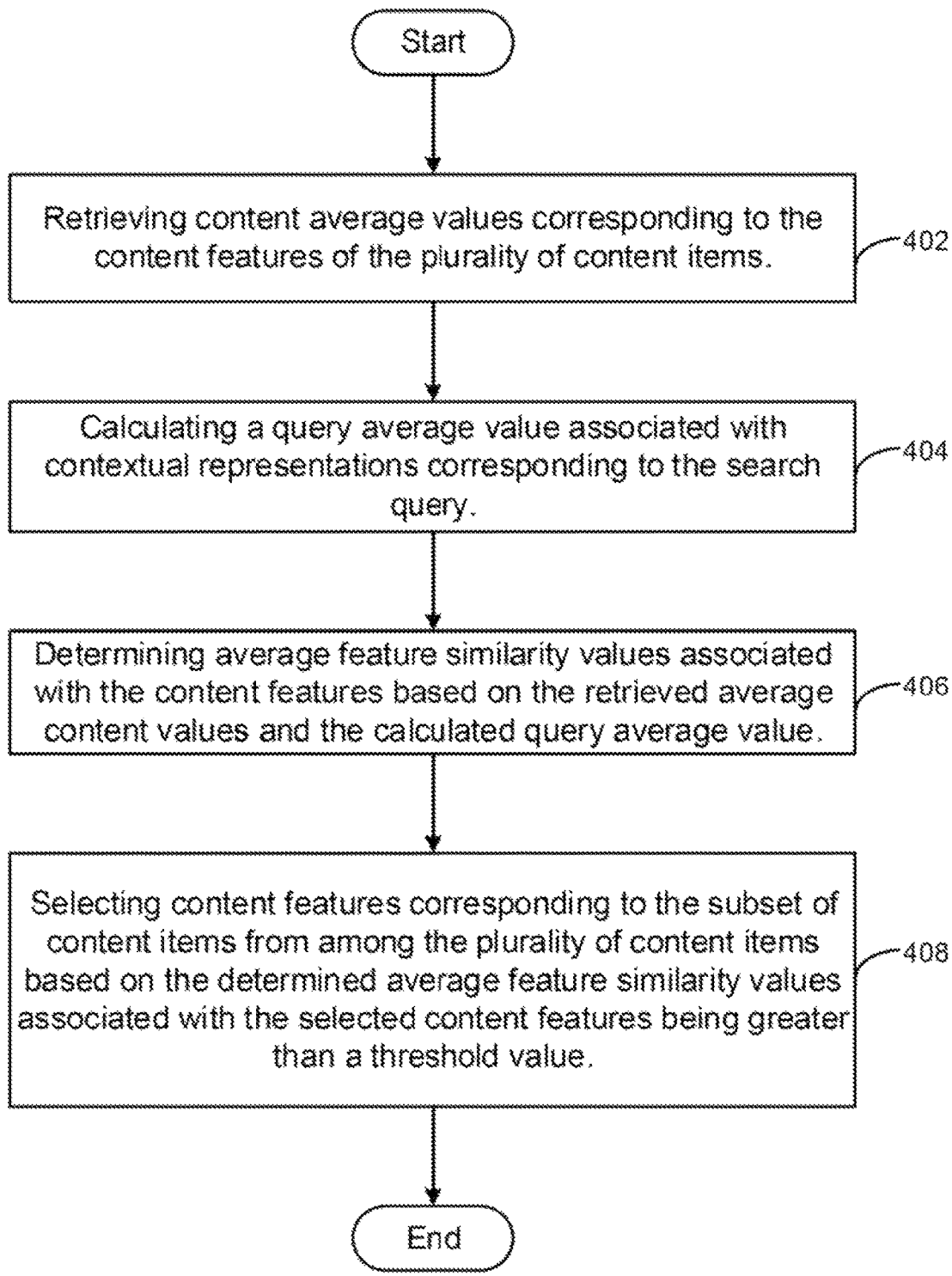
FIG. 4 is an operational flowchart illustrating a content feature retrieval operation, according to at least one embodiment.

Referring now to FIG. 4, an operational flowchart 400 illustrating the image feature retrieval operation 304 of FIG. 3 is depicted. FIG. 4 may be described with the aid of FIGS. 1-3.

At 402, content average values corresponding to the content features of the plurality of content items are retrieved. The computations for image encoding may be performed offline, and the resulting average may be stored in memory, thus yielding O(1) at retrieval time. In operation, the similarity function module 208 (FIG. 2B) may retrieve the stored content average values from the database 112 (FIG. 1) on the server device 114 (FIG. 2B) or the data storage device 106 (FIG. 1) on the client device 102 (FIG. 1).

At 404, a query average value associated with contextual representations corresponding to the search query is calculated. The query average value may correspond to a weighted average of region vectors for each word of the query. In operation, the search query average function module 206 (FIG. 2B) may calculate a query average value based on a contextual representation of the search query.

At 406, overall similarity values associated with the content features are determined based on the retrieved average content values and the calculated query average value. The feature similarity values may be calculated to avoid the pairwise similarity scoring by using a simple mean of region embeddings. In operation, the similarity function module 208 (FIG. 2B) may receive the query average value from the search query average function module 206 (FIG. 2B) and the feature average values from the database 112 (FIG. 1) or the data storage device 106 (FIG. 1) and may calculate one or more overall similarity value.

At 408, content features corresponding to the subset of content items are selected from among the plurality of content items based on the determined overall similarity values associated with the selected content features being greater than a threshold value. The threshold value may be selected in order to limit the total number of content items in order to prevent a bottleneck when determining the attention scores. In operation, the selection module 210 (FIG. 2B) may select one or more content items corresponding to a subset of feature average values from among all of the feature average values calculated by the similarity function module 208 (FIG. 2B).

It may be appreciated that FIGS. 3 and 4 provide only an illustration of one implementation and does not imply any limitations with regard to how different embodiments may be implemented. Many modifications to the depicted environments may be made based on design and implementation requirements.

Figure 5:
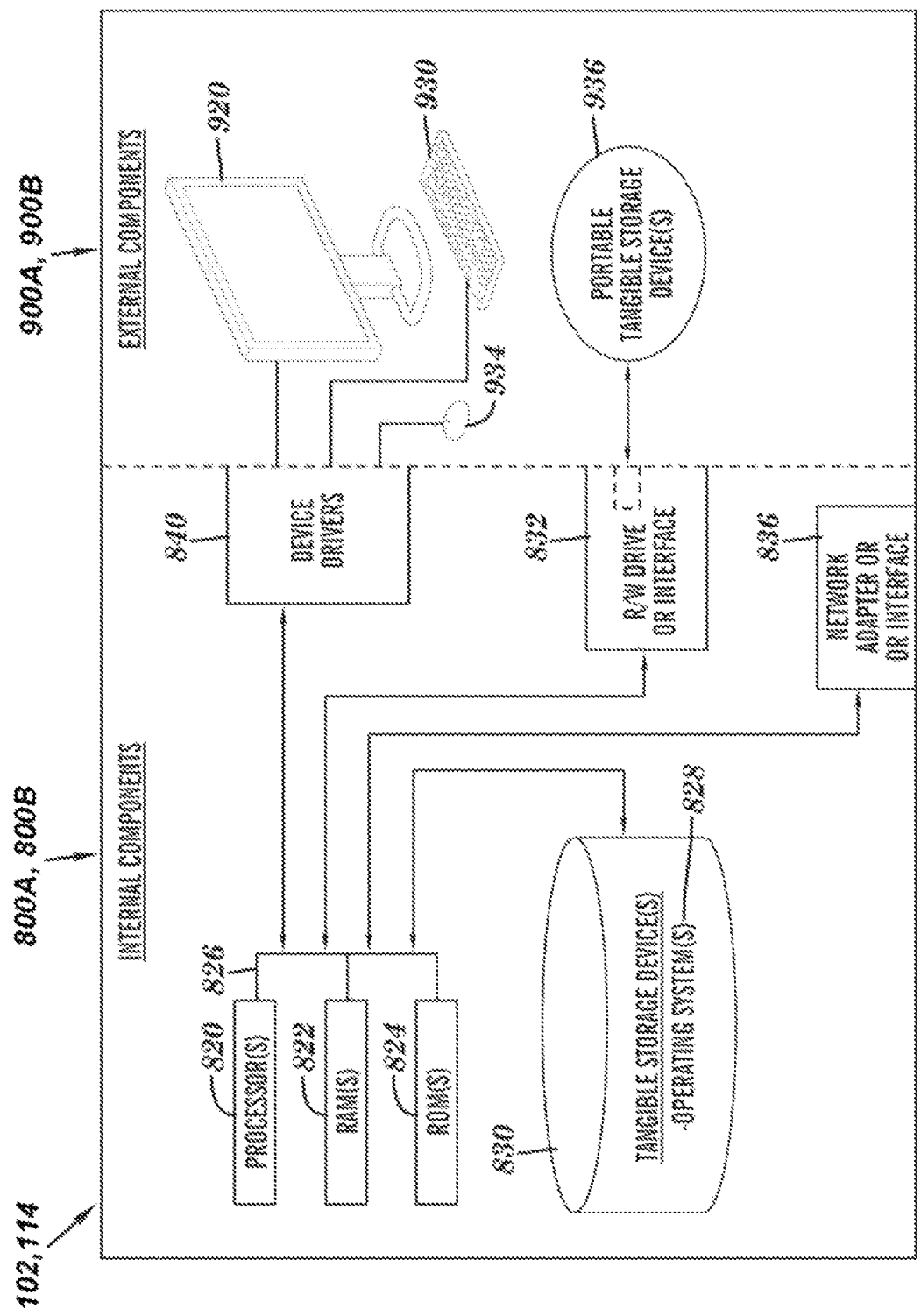
FIG. 5 is a block diagram of internal and external components of computers and servers depicted in FIG. 1 according to at least one embodiment

FIG. 5 is a block diagram of internal and external components of devices depicted in FIG. 1 in accordance with an illustrative embodiment. It should be appreciated that FIG. 5 provides only an illustration of one implementation and does not imply any limitations with regard to the environments in which different embodiments may be implemented. Many modifications to the depicted environments may be made based on design and implementation requirements.

Client device 102 (FIG. 1) and server device 114 (FIG. 1) may include respective sets of internal components 800A,B and external components 900A,B illustrated in FIG. 5. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Multimodal Content Retrieval Program 116 (FIG. 1) on server device 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Multimodal Content Retrieval Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Multimodal Content Retrieval Program 116 (FIG. 1) on the server device 114 (FIG. 1) can be downloaded to the client device 102 (FIG. 1) and server device 114 from an external computer via a network (for example, the Internet, a local area network or other, wide area network) and respective network adapters or interfaces 836. From the network adapters or interfaces 836, the software program 108 and the Multimodal Content Retrieval Program 116 on the server device 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
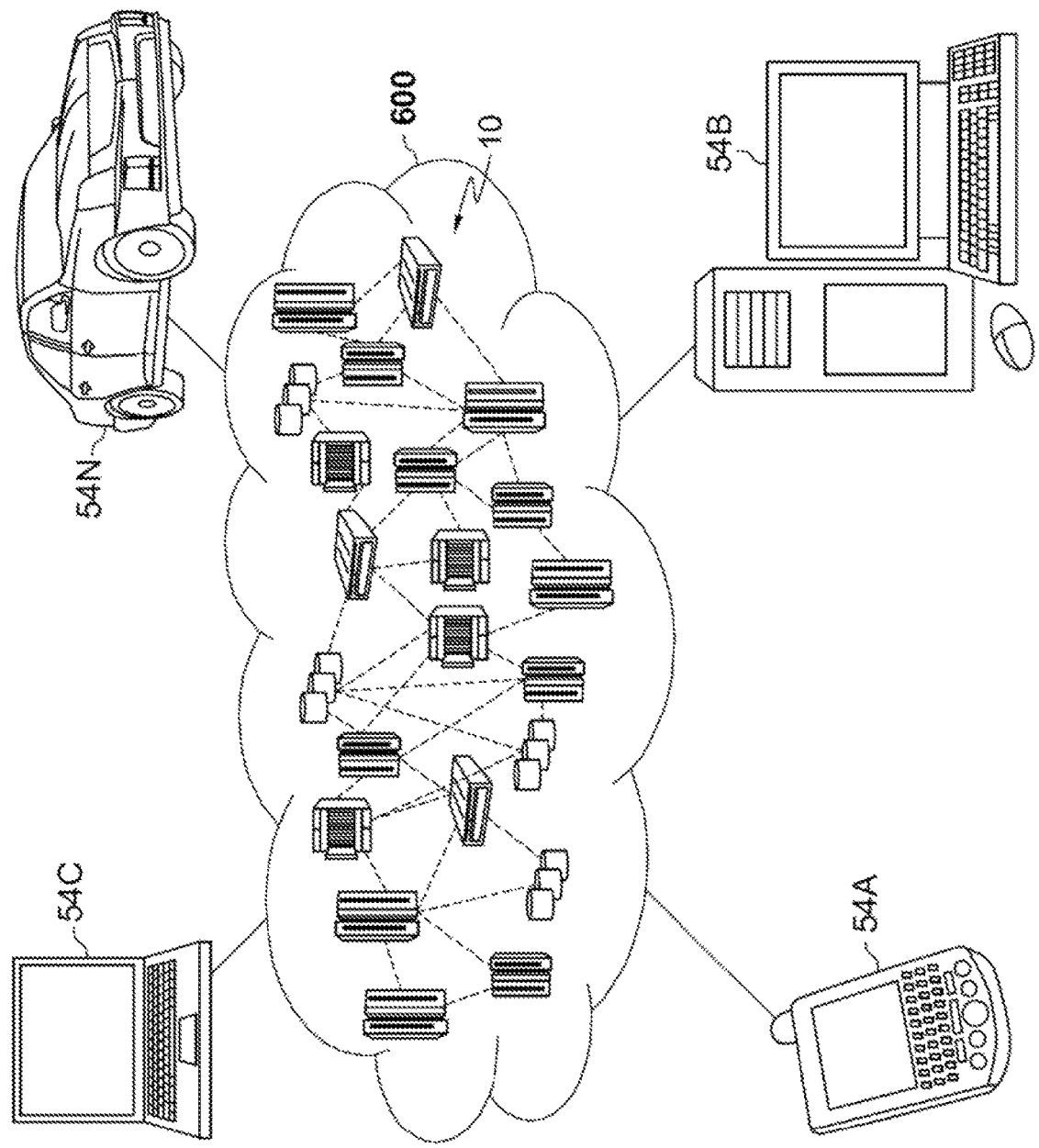
FIG. 6 is a block diagram of an illustrative cloud computing environment including the computer system depicted in FIG. 1, according to at least one embodiment.

Referring to FIG. 6, illustrative cloud computing environment 600 is depicted. As shown, cloud computing environment 600 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 54A-N shown in FIG. 6 are intended to be illustrative only and that cloud computing nodes 10 and cloud computing environment 600 can communicate with any type of computerized device over any type of network and/or network addressable connection (e.g., using a web browser).

Figure 7:
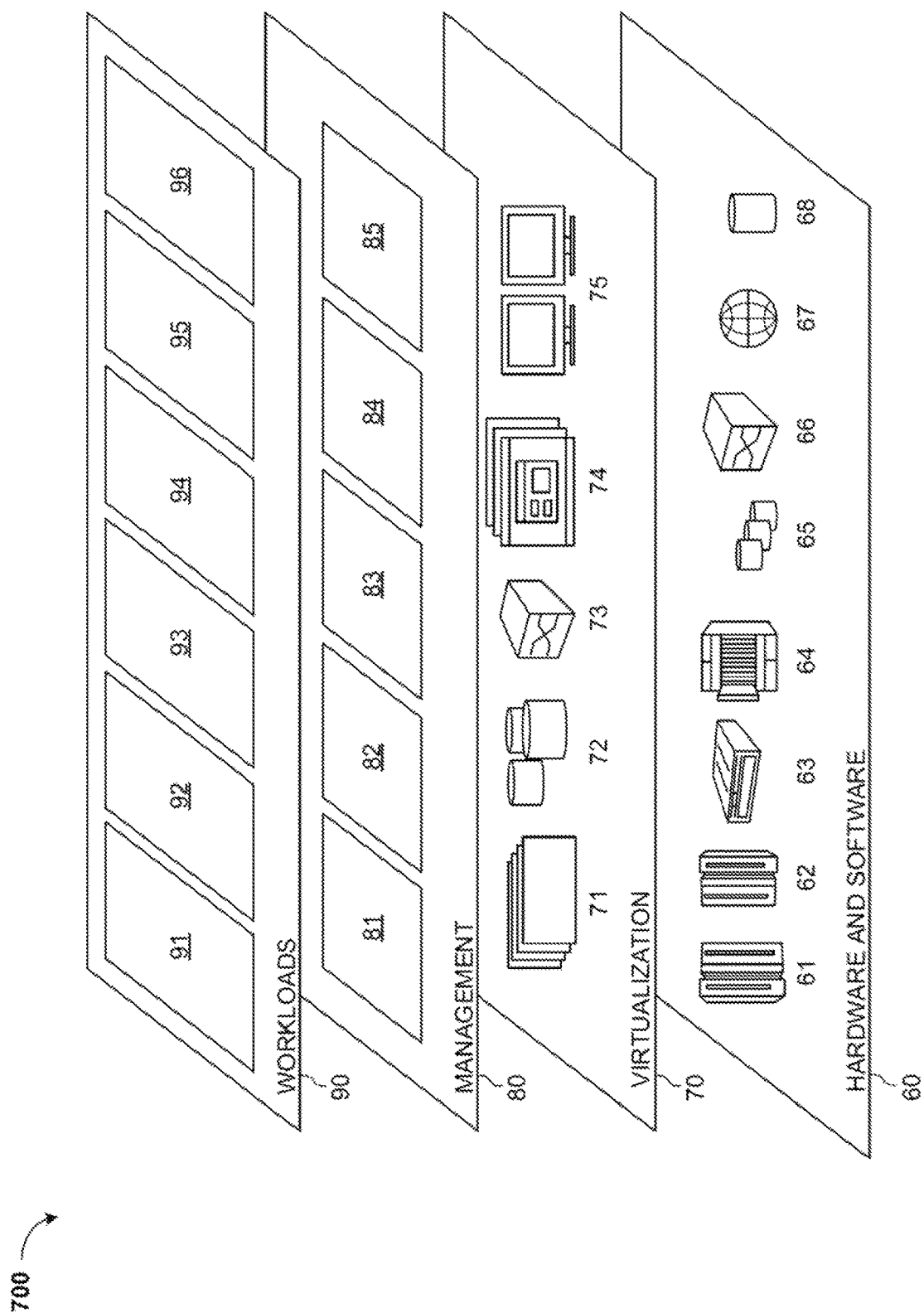
FIG. 7 is a block diagram of functional layers of the illustrative cloud computing environment of FIG. 6, according to at least one embodiment.

Referring to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Multimodal Content Retrieval 96. Multimodal Content Retrieval 96 may search large galleries in real-time without sacrificing retrieval accuracy by using averages of content feature values to act as a coarse filter.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for multimodal content retrieval, comprising:
   receiving a search query corresponding to a request for content;
   retrieving, based on receiving the search query, content features corresponding to a subset of content items from among a plurality of content items;
   calculating similarity values between the search query and the retrieved content features;
   determining attention scores for the calculated similarity values; and
   selecting a content item from among the subset of content items of the plurality of content items, the selected content item containing a content feature corresponding to a highest attention score of the attention scores,
   wherein the retrieving the content features corresponding to the subset of content items from among the plurality of content items, comprises:
      retrieving content average values corresponding to the content features of the plurality of content items,
      calculating a query average value associated with contextual representations corresponding to the search query,
      determining overall similarity values associated with the content features based on the retrieved average content values and the calculated query average value, and
      selecting content features corresponding to the subset of content items from among the plurality of content items based on the determined overall similarity values associated with the selected content features being greater than a threshold value, and
   wherein the overall similarity values correspond to a mean of region embeddings between the content average values and the query average value that approximates attention scores between the content average values and the query average value.

2. The method of claim 1, wherein the similarity values are calculated based on performing a vector distance operation or a vector similarity operation on averaged vectors associated with the retrieved content features.

3. The method of claim 1, wherein the content average values are stored prior to receiving the search query.

4. The method of claim 1, wherein the content average values are calculated by:
   detecting salient regions or grid cells in the content items;
   mapping the detected salient regions or grid cells to a set of vectors; and
   averaging the set of vectors.

5. The method of claim 1, wherein the content average values correspond to averages of vectors corresponding to regions of the content items.

6. The method of claim 1, wherein the query average value corresponds to an average of vectors corresponding to contextual representation of words in the search query.

7. The method of claim 1, wherein the plurality of content items comprise at least one image and at least one video.

8. A computer system for multimodal content retrieval, the computer system comprising:
   one or more computer-readable non-transitory storage media configured to store computer program code; and
   one or more computer processors configured to access said computer program code and operate as instructed by said computer program code, said computer program code including:
      receiving code configured to cause the one or more computer processors to receive a search query corresponding to a request for content,
      retrieving code configured to cause the one or more computer processors to retrieve, based on receiving the search query, content features corresponding to a subset of content items from among a plurality of content items,
      calculating code configured to cause the one or more computer processors to calculate similarity values between the search query and the retrieved content features, determining code configured to cause the one or more computer processors to determine attention scores for the calculated similarity values, and selecting code configured to cause the one or more computer processors to select a content item from among the subset of content items of the plurality of content items, the selected content item containing a content feature corresponding to a highest attention score of the attention scores, wherein the retrieving code comprises:

retrieving code configured to cause the one or more computer processors to retrieve content average values corresponding to the content features of the plurality of content items, calculating code configured to cause the one or more computer processors to calculate a query average value associated with contextual representations corresponding to the search query, determining code configured to cause the one or more computer processors to determine overall similarity values associated with the content features based on the retrieved average content values and the calculated query average value, and selecting code configured to cause the one or more computer processors to select content features corresponding to the subset of content items from among the plurality of content items based on the determined overall similarity values associated with the selected content features being greater than a threshold value, and wherein the overall similarity values correspond to a mean of region embeddings between the content average values and the query average value that approximates attention scores between the content average values and the query average value.

9. The computer system of claim 8, wherein the similarity values are calculated based on performing a vector distance operation or a vector similarity operation on averaged vectors associated with the retrieved content features.

10. The computer system of claim 8, wherein the content average values are stored prior to receiving the search query.

11. The computer system of claim 8, wherein the content average values are calculated by:

detecting salient regions or grid cells in the content items;
mapping the detected salient regions or grid cells to a set of vectors; and
averaging the set of vectors.

12. The computer system of claim 8, wherein the content average values correspond to averages of vectors corresponding to regions of the content items.

13. The computer system of claim 8, wherein the query average value corresponds to an average of vectors corresponding to contextual representation of words in the search query.

14. The computer system of claim 8, wherein the plurality of content items comprises at least one image and at least one video.

15. A non-transitory computer readable medium having stored thereon a computer program for multimodal content retrieval, the computer program configured to cause one or more computer processors to:

receive a search query corresponding to a request for content;

retrieve, based on receiving the search query, content features corresponding to a subset of content items from among a plurality of content items;

calculate similarity values between the search query and the retrieved content features;

determine attention scores for the calculated similarity values; and select a content item from among the subset of content items of the plurality of content items, the selected content item containing a content feature corresponding to a highest attention score of the attention scores, wherein the computer program is further configured to cause one or more computer processors to:

retrieve content average values corresponding to the content features of the plurality of content items, calculate a query average value associated with contextual representations corresponding to the search query, determine overall similarity values associated with the content features based on the retrieved average content values and the calculated query average value, and select content features corresponding to the subset of content items from among the plurality of content items based on the determined overall similarity values associated with the selected content features being greater than a threshold value, and wherein the overall similarity values correspond to a mean of region embeddings between the content average values and the query average value that approximates attention scores between the content average values and the query average value.

* * * * *